(12) United States Patent
Edinger et al.

(10) Patent No.: US 6,518,872 B1
(45) Date of Patent: Feb. 11, 2003

(54) HIGH RESOLUTION SCANNING THERMAL PROBE AND METHOD OF MANUFACTURING THEREOF

(75) Inventors: Klaus Edinger, Laurel, MD (US); Ivaylo Rangelow, Baunaral (DE)

(73) Assignee: University of Maryland, Riverdale, MD (US)

( * ) Notice: Subject to any disclaimer, the term of this patent is extended or adjusted under 35 U.S.C. 154(b) by 0 days.

(21) Appl. No.: 09/951,620

(22) Filed: Sep. 14, 2001

(51) Int. Cl.[7] ................................................ H01L 3/04
(52) U.S. Cl. .............................. 338/25; 338/28; 338/14; 338/2; 338/6
(58) Field of Search ............................ 338/2, 4, 13, 25, 338/28, 3, 5, 6, 10, 14, 23, 24, 22 R (56) References Cited

U.S. PATENT DOCUMENTS

| | | | | |
|---|---|---|---|---|
| 5,171,992 A | * | 12/1992 | Clabes et al. | ................ 250/306 |
| 5,883,705 A | * | 3/1999 | Minne et al. | ................ 355/71 |
| 6,383,823 B1 | * | 5/2002 | Takahashi et al. | ............ 438/14 |

FOREIGN PATENT DOCUMENTS

US         20010028033      * 10/2001

OTHER PUBLICATIONS

2001/0028033 USPUB, Shimizu et al., (Oct. 2001).*
2001/0038598 USPUB, Despont et al. (Aug. 2001).*
"Localized Thermal Analysis Using a Miniaturized Resistive Probe"; A. Hammiche, et al., Rev. Sci. Instrum. 67, 4268 (1996).

"Highly Localized Thermal, Mechanical, and Spectroscopic Characterization of Polymers Using Miniaturized Thermal Probes"; A. Hammiche, et al., J. Vac. Sci. Thecnol., B 18, 1322 (2000).

"Scanning Thermal Microscopy; Subsurface Imaging, Thermal Mapping of Polymer Blends, and Localized Calorimetry"; A. Hammiche, et al., J. Vac. Sci. Technol., B 14 1486 (1996).

(List continued on next page.)

Primary Examiner—Karl D. Easthom
(74) Attorney, Agent, or Firm—Rosenberg, Klein & Lee (57) ABSTRACT

A resistant based thermal probe including a nanometer sized four-leg filament integrated with a piezoresistive AFM type cantilever is created by depositing the filament structure onto the cantilever by a chemical vapor deposition technique where the cantilever is exposed to the flux of precursor gas. An incident electron beam causes a fragmentation of the gas molecules leaving a deposit behind which leads to a conductive deposit shaped as a multi-leg filament structure for thermal measurements of a sample. A deposited four leg filament structure has a mechanical rigidity, high spatial resolution, low thermal conductivity and thermal capacitance, fast response time, and in combination with a four point resistant measurement and lock-in technique, eliminates resistivity for increasing both the temperature sensitivity and the signal-to-noise ratio of the thermal probe.

10 Claims, 10 Drawing Sheets

OTHER PUBLICATIONS

"Photothermal FT–IR Spectroscopy: A Step Towards FT–IR Microscopy at a Resolution Better Than the Diffraction Limit"; A. Hammiche, et al., Appl. Spectrosc. 53, 810 (1999).

"Thermal Microscopy and Heat Generation in Electronic Devices"; A. Majumdar, Microelectronics Reliability 38, 559 (1998).

"Thermal Characteristics of Submicron Vias Studied by Scanning Joule Expansion Microscopy"; M. Igeta, et al., IEEE Electron Device Lett. 21, 224 (2000).

"Scanning Thermal Microscopy of a Vertical–Cavity Surface–Emitting Laser", K. Luo, et al., Appl. Phys. Lett. 71 1604 (1997).

"Scanning Thermal Profiler"; C. C. Williams, et al., Appl. Phys. Lett. 49, 11387 (1986).

"Micromachined Fabrication of Si Cantilevers with Schottky Diodes Integrated in the Tip"; T. Leinhos, et al., Applied Physics A (Materials Science Processing) 66, 65 (1998).

"Scanning Thermal Microscopy"; A. Majumdar, Annu. Rev. Mater. Sci. 29, 505 (1999) (no month).

"Fabrication of Piezoresistive Sensed AFM Cantilever Probe with Integrated Tip"; I. W. Rangelow, et al., Proc. SPIE 2879, 56 (1996).

"Atomic Force Microscopy and Lateral Force Microscopy Using Piezoresistive Cantilever"; R. Linnemann, et al., J. Vac. Sci. Technol., B 14, 856 (1996).

"Dry Etching with Gas Chopping Without Rippled Sidewalls"; B. Volland, et al., J. Vac. Sci. Technol., B 17, 2768 (Sep. 1999).

"Electron–Beam Induced Tungsten Deposition: Growth Rate Enhancement and Applications in Microelectronics", K.T. Kohlmann–von Platen, et al., J. Vac. Sci. Technol., B 10, 2690 (1992).

"Characterization and Application of Materials Grown by Electron–Beam–Induced Deposition"; H.W.P. Koops, et al., Jpn. J. Appl. Phys., Part 1 33, 7099 (1994).

"Conductive Dots, Wires, and Supertips for Field Electron Emitters Produced by Electron–Beam–Induced Deposition on Samples Having Increased Temperature"; H.W.P. Koops, et al.; J. Vac. Sci. Technol., B 14, 6, p. 4105 (1996).

"Fabrication of Multipurpose Piezoresistive Wheatstone Bridge Cantilevers with Conductive Microtips for Electrostatic and Scanning Capacitance Microscopy"; T. Gotszalk, et al., J. Vac. Sci. Technol. B 16, 6, p. 3948 (1998).

"Piezoresistive Sensors for Scanning Probe Microscopy"; T. Gotszalk, et al., Ultramicroscopy 82, pp. 39–48 (2000).

"Micromachined Piezoresistive Cantilever Array with Integrated Resistive Microheater for Calorimetry and Mass Detection"; N. Abedinov, et al., J. Vac. Sci. Technol. A 19, 6, P. 2884 (Aug. 2001).

"Characteristics of Gas–Assisted Focused Ion Beam Etching"; R. J. Young, et al., J. Vac. Sci. Technol. B 11, 2, P. 234 (1993).

* cited by examiner

HIGH RESOLUTION SCANNING THERMAL PROBE AND METHOD OF MANUFACTURING THEREOF

FIELD OF THE INVENTION

The present invention relates to scanning thermal microscopy; and more particularly, to a resistance-based probe which is used for mapping spatial variation of the thermal properties of a surface, such as temperature, thermal conductivity, and thermal diffusivity as well as being used for detecting various chemical reactions and phase transformations taking place within the studied sample.

More particularly, the present invention relates to a high resolution scanning thermal probe which includes a nanometer sized filament structure formed at the end of an AFM-type cantilever where the force is detected by either optically measuring the deflection or by means of an integrated piezoresistive element.

Further, the present invention relates to a free-standing nanometer sized probe for thermal measurements having decreased thermal conductivity and thermal capacitance thus insuring faster response time, higher frequencies in the active measurement mode (when the probe is heated), and improved spatial Still further the present invention relates to a four legged thermal probe and a method for producing the four legged thermal probe as well as to a four points resistance measurement technique which results in the elimination of contact potential and contact resistivity thus increasing both the temperature sensitivity and the signal-to-noise ratio of the thermal measurements.

BACKGROUND OF THE INVENTION

Scanning thermal microscopy is a near field technique which permits mapping of spatial variations of thermal properties of a sample, such as temperature, thermal conductivity and diffusivity with sub-micrometer resolution. This type of microscopy has been applied to the study of thermal properties of polymers and pharmaceuticals, locally induced phase transformations, and spatially resolved photothermal spectroscopy as well as other scientific areas. With the continued reduction of the size of integrated circuits, temperature mapping of electronic and optoelectronic devices has become increasingly more important to optimize heat dissipation in the circuits and to identify phase modes caused by local "hot spots".

Various types of probes with different heat sensitive elements, including thermocouples, contact potentials, Joule expansion elements, Schottky diodes, and resistance based transducers have been developed over the last few years. Prior art systems include thermal probes which may be a resistive probe consisting of a wire making point contact with a sample for scanning the sample surface. In a passive mode of the measurement when no heat is applied to the probe, the temperature of the sample is measured by monitoring the change in the resistivity of the wire. While in the active mode, the sample is locally heated by applying alternating electric current to the wire, thus allowing measurement of thermal conductivity and thermal diffusivity of the sample. Additionally induced local changes such as phase transformations or chemical reactions in the sample may be measured. Due to the fact that the measurement involves heat flow from the sample to the probe, a large thermal resistance of the probe is required in order to improve the accuracy of the thermal measurement.

Disadvantageously, prior art thermal probes such as, for example, TM Microscopes Cantilever conventionally used in resistance based transducers, use a sensitive element consisting of a five micron diameter Platinum Rhodium wire which, due to its large dimensions, is unable to provide a high spatial resolution measurement. Additionally, such a wire has undesirably low thermal resistance and high thermal capacitance which decreases the accuracy of the measurements and deteriorates the sensitivity as well as the response time of the temperature measurement.

Building or fabricating a freestanding nanometer sized probe would advantageously decrease both the thermal conductance and the capacitance, thus insuring faster response time and higher frequencies in the active mode of measurements, as well as providing an improvement in the spatial resolution of the probe.

As described in U.S. Pat. No. 5,171,992, nanometer scale probes for magnetic measurement are produced by an electron beam chemical vapor deposition (CVD) process in which a substrate is placed in an evacuated chamber within an electron beam unit, and a volatile organometallic compound gas stream is introduced into the sub-chamber at the same time an electron beam is initiated.

The electron beam impinges upon an upper surface of the substrate and causes decomposition and preferential deposition of the decomposed product of the organometallic gas onto the surface of the substrate. Such deposition occurs within the region irradiated by electron beam. Some deposition also occurs outside the region irradiated by the electron beam due to electron scattering from the surface of the substrate. As the process continues, additional layers of the deposited decomposed components of the organometallic gas continue to build up thereby creating a needle like structure. A conical tip shape for the created needle and its shank diameter are achieved by control of the primary beam voltage and the beam's Gaussian profile. The fabricated needle is covered by a magnetic metal layer to allow the intended magnetic measurements. By manipulating the electron beam, two and three dimensional needle tip structures may be fabricated.

Although the technique described in U.S. Pat. 5,171,992 permits production of nanometer scale probes, the resulting probes are not suited for thermal measurements and are not applicable to four point thermal measurement techniques.

SUMMARY OF THE INVENTION

It is therefore an object of the present invention to provide a mechanically stable nanometer scale thermal probe adapted for thermal measurements, having a high spatial resolution, fast response time, high thermal resistance and high signal-to-noise ratio.

It is another object of the present invention to provide a technique for producing a multi-leg nanometer scale thermal probe enabling highly accurate measurements of temperature, thermal conductivity and thermal diffusivity of a sample, as well as inducing local changes such as phase transformations and/or chemical reactions.

It is still a further object of the present invention to provide a four point thermal measurement technique employing a four leg nanometer scale probe through which a current (AC or DC) is applied to two legs of the probe and the voltage drop indicative of a temperature value is measured by contacting the opposite two legs, thus eliminating contact resistance, improving temperature dependence of the resistance and eliminating the error in the temperature readings introduced by temperature gradients along the filament wire.

According to the teachings of the present invention, a thermal nanometer scale probe for thermal measurements of a sample includes an AFM-type cantilever where the force is detected by either optically measuring the deflection or by means of an integrated piezoresistive element. The AFM-type cantilever includes a conductive patterned layer (preferably Au) formed on the surface, and a multi-leg nanometer scale filament structure deposited on the electrically isolated segments of the conductive patterned layer of the AFM-type cantilever. The multi-leg nanometer scale filament structure includes a plurality of legs, a bridge portion, and a contact tip positioned in the center of the bridge portion. Each leg of the multi-leg filament structure has a bottom end contiguously engaging a respective one of the plurality of electrically isolated segments of the conductive patterned layer on the AFM-type cantilever. A top end of each leg of the multi-leg filament is joined with the top ends of other legs of the filament structure by the bridge portion from which the contact tip extends into point contact with the measured sample.

Although the multi-leg nanometer scale filament structure may include two and three legs, a three-dimensional four legged structure is preferred due to its mechanical rigidity, its ability to use a four point measurement technique, low thermal conductivity and fast time response as well as improved signal-to-noise ratio and high spatial resolution of the measurements.

The electrically isolated segments of the conductive (preferably gold) patterned layer on the AFM-type cantilever are electrically separated by respective gaps cut, etched or otherwise formed in the surface of the conductive patterned layer at predetermined locations in order that each gap includes an undercut portion having sidewalls which are inaccessible to a conductive material deposited onto the surface of the conductive patterned layer thus eliminating a danger of creating a "short" between the lower ends of the filament legs.

The conductive patterned layer is formed in close proximity to a front end of the cantilever, preferably within 10 micron distance from a front edge. The front edge of the cantilever is trimmed to form an angled front edge which aids in the deposition process when the cantilever structure is to be angled or inclined with respect to the axis of the electron beam.

As another aspect of the present invention, such provides a method for producing a thermal nanometer scale probe including the steps of:

microfabricating a cantilever, forming a patterned conductive layer in proximity to the front edge of the cantilever, cutting or otherwise forming a plurality of gaps in the patterned conductive layer to develop electrically isolated segments of the patterned conductive layer, and growing a multi-leg nanometer scale filament structure having a plurality of legs, a bridge portion, and a contact tip positioned substantially at the center of the bridge portion.

The growth of the nanometer scale filament structure is conducted by a focused electron beam chemical vapor deposition technique including the following operational steps:

(a) exposing the cantilever to a precursor gas, (b) directing an electron beam to a predetermined location on each of the electrically isolated segments of the pattern conductive layer in a predetermined sequence for a predetermined time duration to permit the formation of a conductive deposit at the predetermined locations on each of the electrical isolated segments thus forming lower ends of the legs of the nanometer scale filament structure, (c) sequentially changing a relative disposition between the electron beam and the cantilever thus growing the legs of the filament structure by depositing the conductive deposits starting from the lower ends of the legs and continuing through a plurality of successive points until the upper ends of the legs are joined to each other by the bridge portion extending over the gaps which are formed in the patterned conductive layer, and (d) directing the electron beam substantially to the center of the bridge portion to grow the contact tip of the filament structure.

Where the filament structure has four legs, two crossing gaps are cut into the patterned conductive layer on the surface of the cantilever thus defining four electrically isolated segments. The filament structure may be grown in a number or variety of ways. In one fabrication technique the electron beam may be directed substantially perpendicular to the cantilever and scanned in predetermined successive steps of predefined time duration (starting with the predetermined locations on each of the four electrically isolated segments) either in a clockwise or counter-clockwise fashion in order to grow the four legs in a quasi-simultaneous manner.

Alternatively, only two legs at a time of the four leg structure may be grown in the quasi-simultaneous manner, changing precursor gases before depositing the other two legs. In this manner, a structure with pairs of legs formed of different materials may be formed, thus producing a thermocouple structure.

In still another technique, the filament structure may be grown by maintaining the electron beam substantially stationary and tilting the cantilever a predetermined angle relative to the electron beam. When one leg of the filament structure is grown, the cantilever is turned in a manner whereby the cantilever structure is angled with respect to the electron beam and the second leg is grown until the upper ends of these two legs are joined together. Since the two legs of the filament structure are grown independently each from the other, the legs may be grown from two different materials thus forming a structure similar to a thermocouple.

Usually the total deposition time for growing the filament structure is in the range of 2–6 minutes, thus allowing filament growth having leg lengths in the range of 2–5 microns, with a diameter of each leg in the range of 30–100 nm. The end radius of a contact tip grown in the center of the bridge portion of the filament structure is smaller than 20 nm providing high resolution of the temperature measurements by the thermoprobe of the present invention.

It has been found that the growth rate for the deposit decreases during electron beam deposition (e.g., the amount of material added for a given electron beam exposure) decreases with the distance from the base point at the substrate, causing a "bending" of the deposited structure. This effect can be corrected by increasing the exposure time with each successive step, in order to account for the decreased growth rate. In this manner substantially straight legs may be grown, if desired.

Still further, the present invention provides a method for 2-point and 4-point thermal measurement of a sample by which a nanometer scale thermoprobe is brought into contact with a sample to be measured. The nanometer scale thermoprobe includes an AFM-type cantilever integrated with a filament structure having four legs, a bridge portion joining the upper ends of the legs, and a contact tip extending from the center of the bridge portion for contiguous point contact with a sample to be measured. In the 2-point measurement, an electric current is applied to two legs, and a voltage drop is measured at the legs. In the 4-point thermal measurement technique, an electric current is applied to first and second legs of the filament structure and a voltage drop indicative of a sample temperature is measured at a third and fourth leg of the filament structure.

The measurement can be conducted in two modes, namely: passive mode when the temperature measurements are conducted by monitoring the thermoprobe temperature scanning the thermoprobe over the surface of the sample; and in an active mode by heating the thermoprobe, monitoring the heat flow between the thermoprobe and the sample to be measured and deriving the thermo conductivity and thermodiffusivity of the sample from the obtained data.

These and other features and advantages of the subject invention will be more fully understood from the following detailed description of the accompanying Drawings.

DESCRIPTION OF THE PREFERRED EMBODIMENT

Figure 1A:
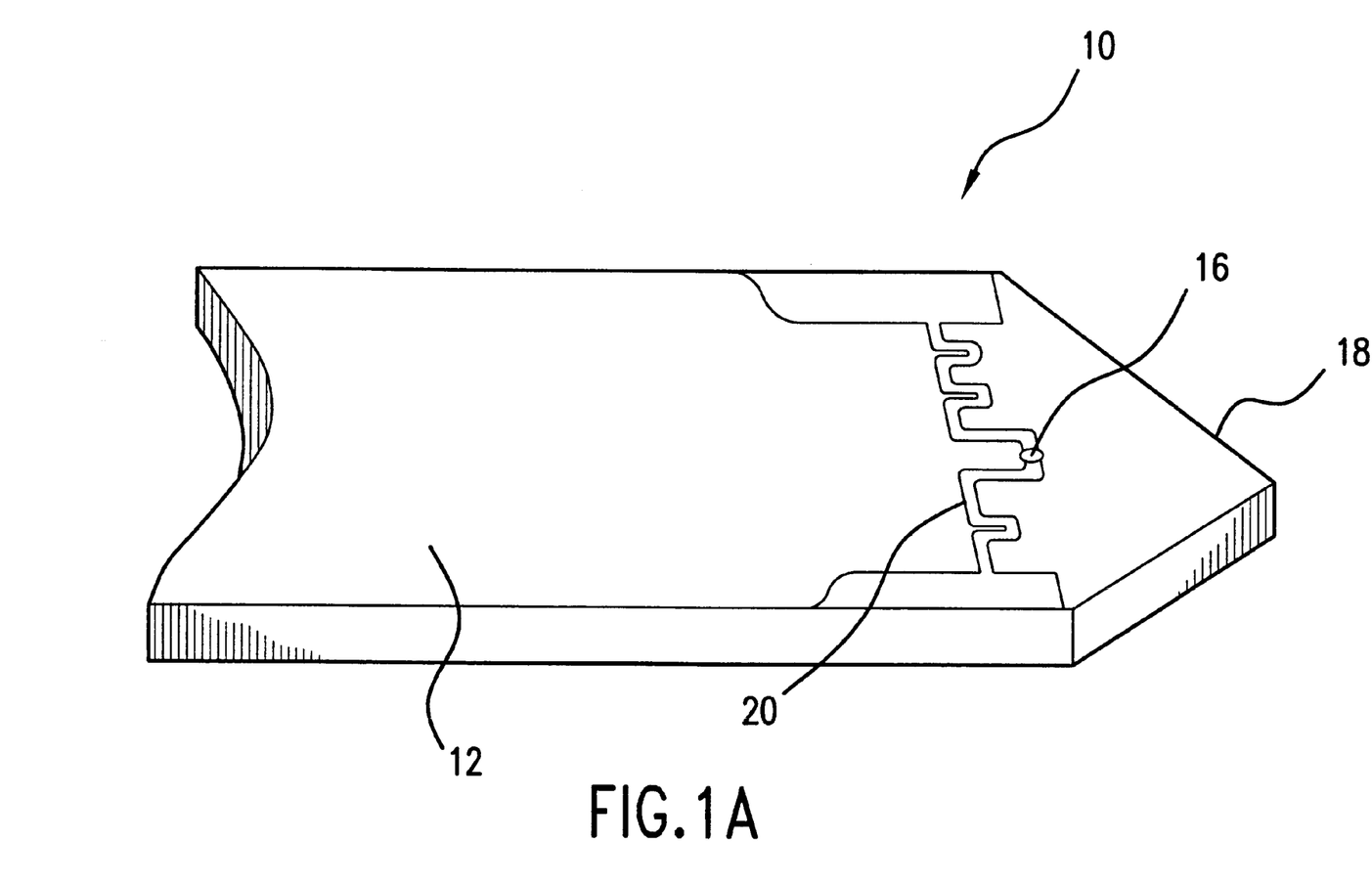
FIG. 1A is a simplified perspective representation of a nanometer scale thermoprobe of the present invention.
Figure 1B:
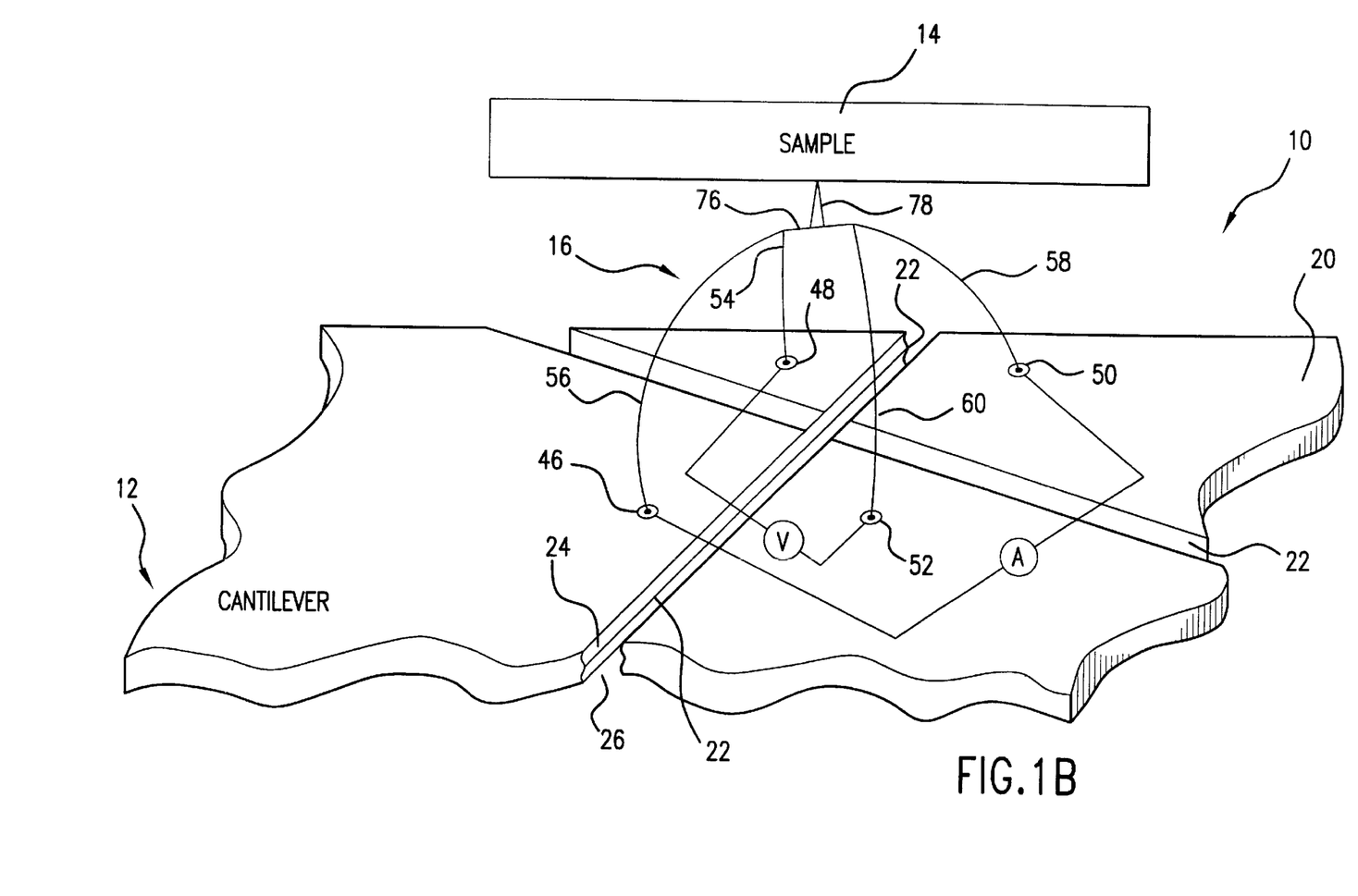
FIG. 1B is a representation of a 4-point thermal measurement set-up using the 4-leg nanometer scale probe of the present invention.

Referring to FIGS. 1A and 1B, a resistance thermal nanometer scale probe 10 is shown which includes an AFM-type cantilever 12 integrated with a filament structure 16 grown on a patterned conductive layer 20 for thermal measurements of a sample 14. The thermal measurements of the sample are conducted in two modes: the passive mode where the temperature is monitored as the probe 10 is scanned across the surface of the sample 14, and the active mode where the probe 10 induces heat flow to the sample 14 which depends on the thermal conductivity of the sample. In the active mode, the thermal nanoprobe 10 operates as a highly localized source of heat used for thermal analysis.

The fabrication of the thermal probe 10 includes two portions: the microfabricating of the AFM-type cantilever 12 and the deposition of a nanometer sized filament 16 at the front end 18 of the cantilever 12. Since there are at least two methods to determine the force load of the cantilever, i.e., piezoresistive techniques and optical techniques, the cantilever 12 may be fabricated either for piezoresistive-based measurements or a silicon nitride cantilever which is fabricated for optical deflection measurements. As an example, in the fabrication of the piezoresistive AFM-type cantilever 12, a double-sided polished, <100> oriented, 3–7 Ωcm silicone wafer may be used as the starting material. Subsequently standard CMOS processing takes place including oxidation, phosphorous and boron diffusion, and ion implantation (as best shown in FIGS. 2A–2E). After this dry and wet etching, insulator and gold film deposition, and photolithography (best shown in FIGS. 2F–2H) are sequentially applied to form piezoresistors, P+ diffusion connecting paths, contact windows, and metallic connections such as gold leads 20 at the front side of the wafer.

In order to achieve deflection sensitivity of the cantilever less than $6 \times 10^{-5}$ ΔR/R per nm, and taking into consideration that the highest stress caused by bending of the cantilever is concentrated on the surface, a low voltage (20 keV) boron implantation step and rapid thermal annealing at 800° C. for 30 seconds may be employed.

In this manner, very shallow resistors are fabricated. The resistors may be buried 50 nm under the surface of the wafer. In this condition with respect to the carrier scattering, surface states are not involved in the carrier transportation which effects improved stability of the piezoresistive sensor device and high sensitivity. In a following back side processing sequence, a corner compensated membrane pattern is created by a two-sided photolithography process and anisotropic deep etching with electrochemical etch stop of silicone in 10% TMAH solution at 70° C. to create a 10 micron thick silicone membrane defining the cantilever. Finally, the cantilever is defined in the membrane by a last photolithographic step applied to the top side of the wafer and silicone dry etching using ICP (inductively coupled plasma) with gas chopping of $SF_6$ and $C_4F_8$ gases.

A five micron thick photoresist AZ 4562 is used to mask the piezoresistive circuit and the resistive microheater during the dry etching. After completion of this process, a piezoresistive cantilever with a deflection sensitivity of 0.1 nm is obtained which includes a patterned gold layer 20 for contacting the nanometer filament structure 16.

In the fabrication of the nanoprobe 10 a combination of focused ion beam and focused electron beam direct writing techniques may be used. All fabrication steps are carried out in a combined scanning electron microscope/focused ion beam workstation (FEI 620 dual beam). However, simultaneous use of both systems is not required, and therefore, the process may be actuated sequentially in separate systems. The fabrication of the nanoprobe 10 includes the following steps:

(1) cutting a gap into the gold leads 20, and (2) depositing the filament structure 16.

Figure 2A:
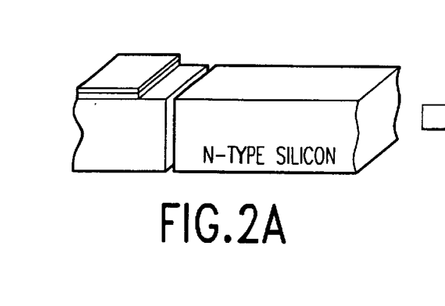
FIGS. 2A–2H illustrate fabrication process sequences of the piezoresistive cantilever.
Figure 2B:
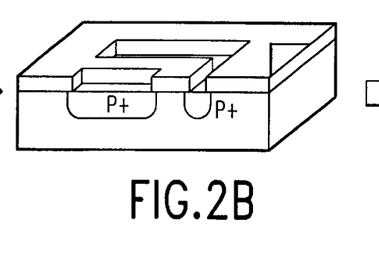
Figure 2C:
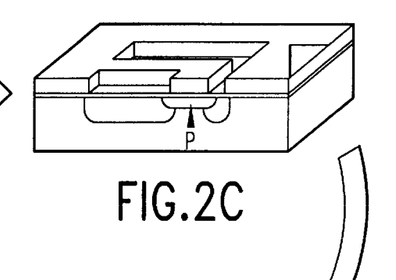
Figure 2D:
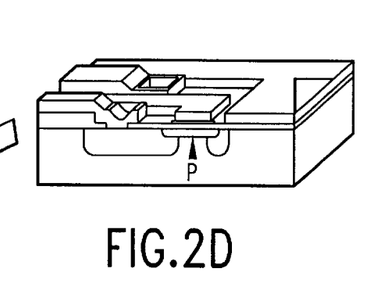
Figure 2E:
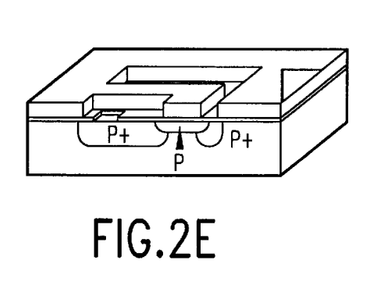
Figure 2F:
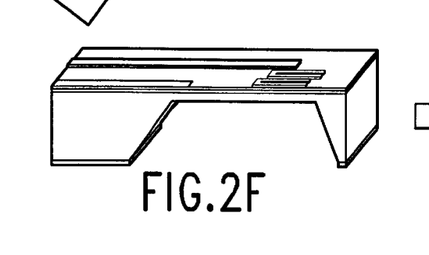
Figure 2G:
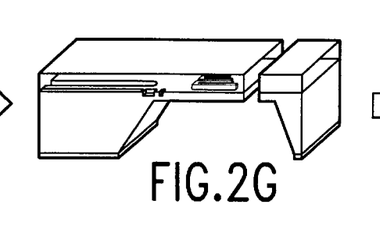
Figure 2H:
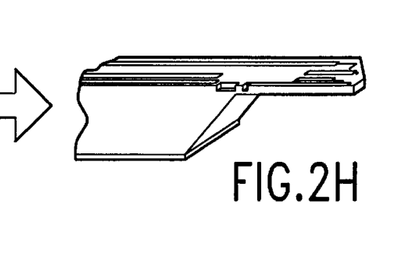

The first step of fabrication, i.e., cutting a gap into the gold leads, is performed by means, for example, of ion beam milling, or by conventional lithography and wet and dry etching. As best shown in FIG. 2A, the gap 22 has an upper portion 24 which has a width in the range of sub 100 nm to 10 μm microns and a lower portion 26 which is created by a conventional technique for eliminating possibility of a short by residue between the legs of the created filament. This may be achieved, for example, by locally etching the material underneath the metal leads, thus creating either an undercut, as shown in FIG. 2A, or removing material for creating a void at the bottom of the gap. Particularly, to create the lower portion 26, the focused ion beam may be used to mill a gap into the gold layer, and then, the underlying silicon oxide is etched and undercut by immersing the structure in hydrofluoric acid.

In the second step, i.e., depositing the filament, the filament is deposited by an electron (or ion) beam deposition technique where the cantilever 12 is exposed to a flux of a precursor gas 29 using a thin gas tube (not shown) placed in close proximity to the cantilever within the scanning field of the electron beam.

Figure 3A:
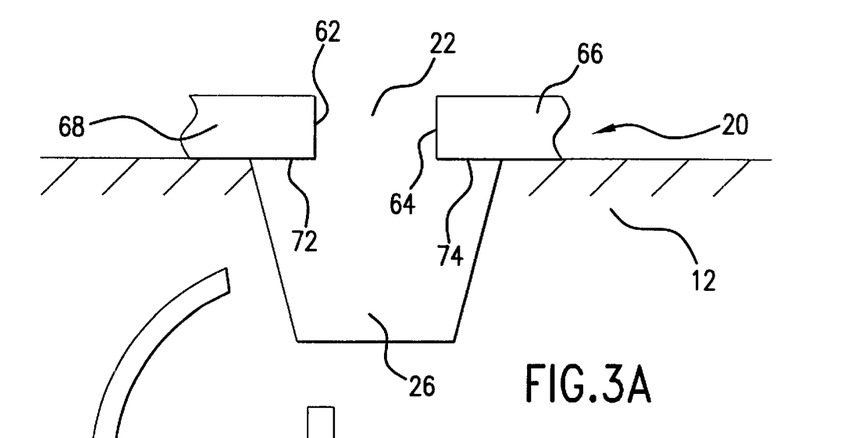
FIGS. 3A–3D illustrate the filament growth steps using a stationary electron beam technique of the present invention.
Figures 3B, 3C:
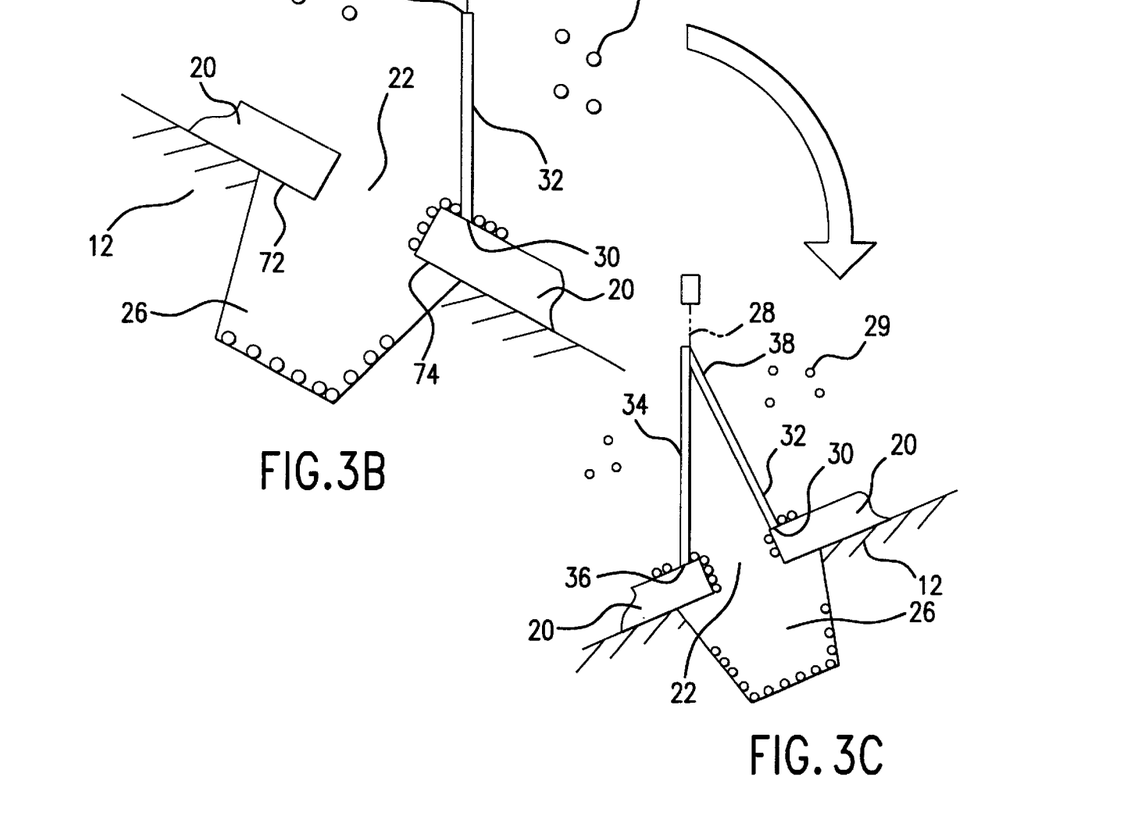
Figure 3D:
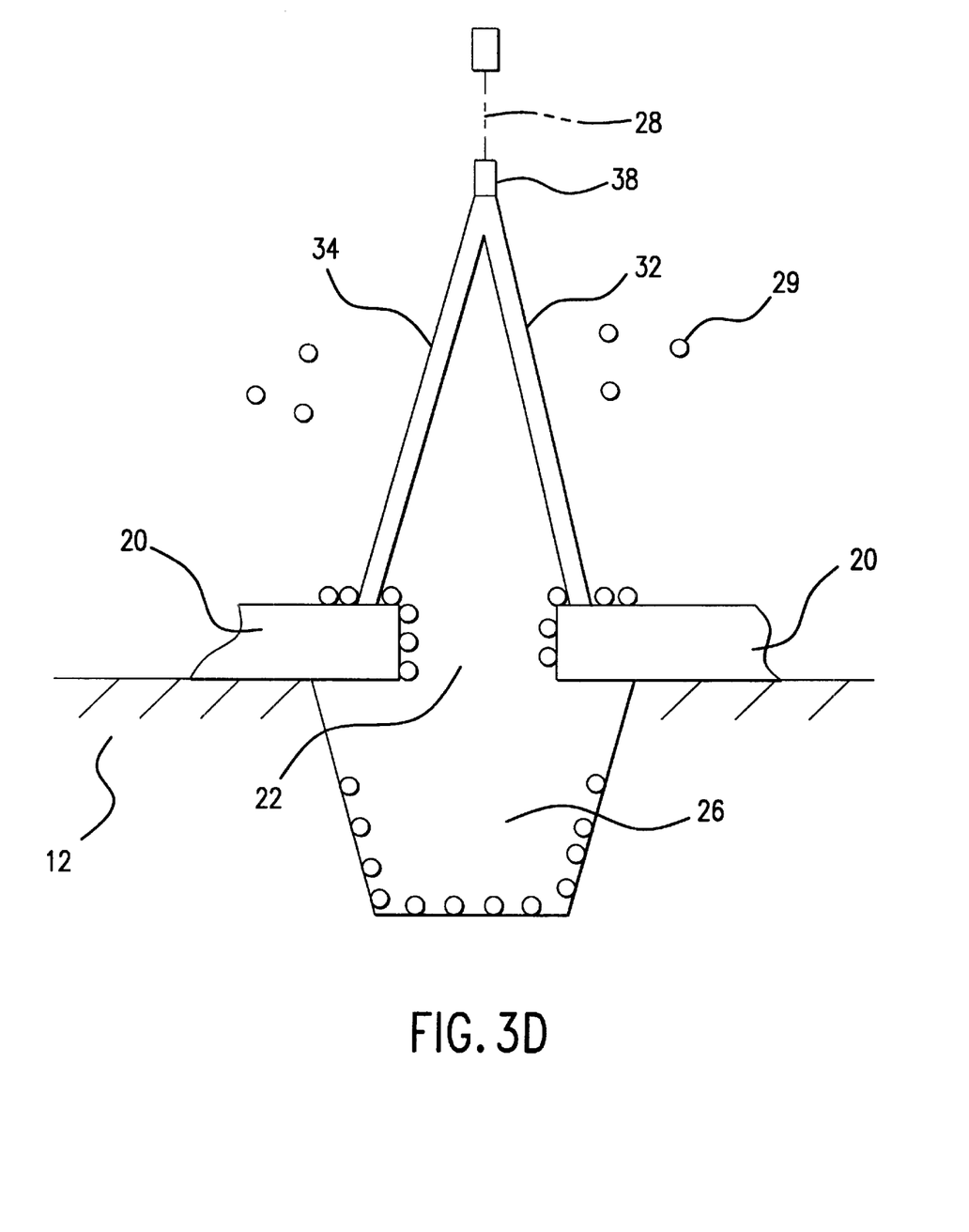

Referring to FIGS. 3B–3D, the incident electron (or ion) beam 28 causes a fragmentation of the gas molecules leading to a deposit. When methylcyclopentagienyl trimethyl platinum has been used as precursor gas 29, a conductive deposit was formed consisting of sub-ten nanometer size platinum crystallites embedded into an amorphous carbonaceous matrix with a resistivity in the range of 900 Ωcm. The conductive deposits also may include tungsten, gold, molybdenum and cobalt.

Total deposition times for the filament structure are generally less than 20 minutes depending on the geometry and precursor gas flux. At this relatively long time interval, the avoidance of samples drift with respect to the incident electron beam is extremely critical. To eliminate electrical charging of the substrate during deposition, a low resistivity connection of metal leads to instrument ground may be provided. Drift due to the introduction of a precursor gas flow 29 is controlled by opening the gas valve about 30 seconds prior to switching the electron beam "ON" for patterned deposition and by scanning a larger field (e.g., 10×10 micron) with the electron beam 28.

After annealing the deposited filaments for several hours at approximately 150° C., a stable IV characteristic is obtained with a temperature dependence exhibiting a negative temperature coefficient of resistivity. The conductance mechanism in this deposit has been found to be consistent with a Poole-Frenkel type conduction with a temperature dependence of the conductance G according to $G \sim \exp(\alpha/kT)$.

Two different deposition strategies have been used to fabricate the filament structure of the present invention. However, in both cases, the final step is directed to the electron beam deposition of a sharp needle with the end radius approximately 10 nm at the apex of the filament to increase the spatial resolution of the probe. In the first method, as shown in FIG. 3B, the electron beam 28 is directed to, and maintained stationary at one spot 30 of a gold lead 20, resulting in linear directed deposits 32 (first leg of the targeted filament structure) substantially parallel to the direction of the electron beam 28. In order to bridge the gap 22 between the two gold leads 20, the first leg 32 of the filament structure is deposited at an angle between 25 and 30 degrees relative to the cantilever 12 by tilting the same with respect to the electron beam 28.

The second leg 34, best shown in FIGS. 3C and 3D, is then deposited at an angle of −25 to −30 degrees by rotating the stage 180 degrees or by tilting the cantilever in the opposite direction. Prior to the deposition of the second leg 34, the location of the first leg 32 is registered by acquiring an SEM (scanning electron microscope) image and the position of the second spot 36 was placed next (approximately 10 nm) to the apex 38 of the first leg 32. Deposition time for both legs 32 and 34 is kept substantially the same. In this technique, the electron beam 28 is generally refocused for deposition of the second leg 34 and obtaining a constant beam diameter for both deposits becomes important in order that both legs grow at the same rate and eventually merge together at the apex 38. Due to the fact that the legs 32 and 34 are deposited in two successive steps, it is possible to deposit two different materials, thus creating a thermocouple structure where the first leg 32 consists of one conductive material while the second leg 34 is formed of another material.

Figure 4:
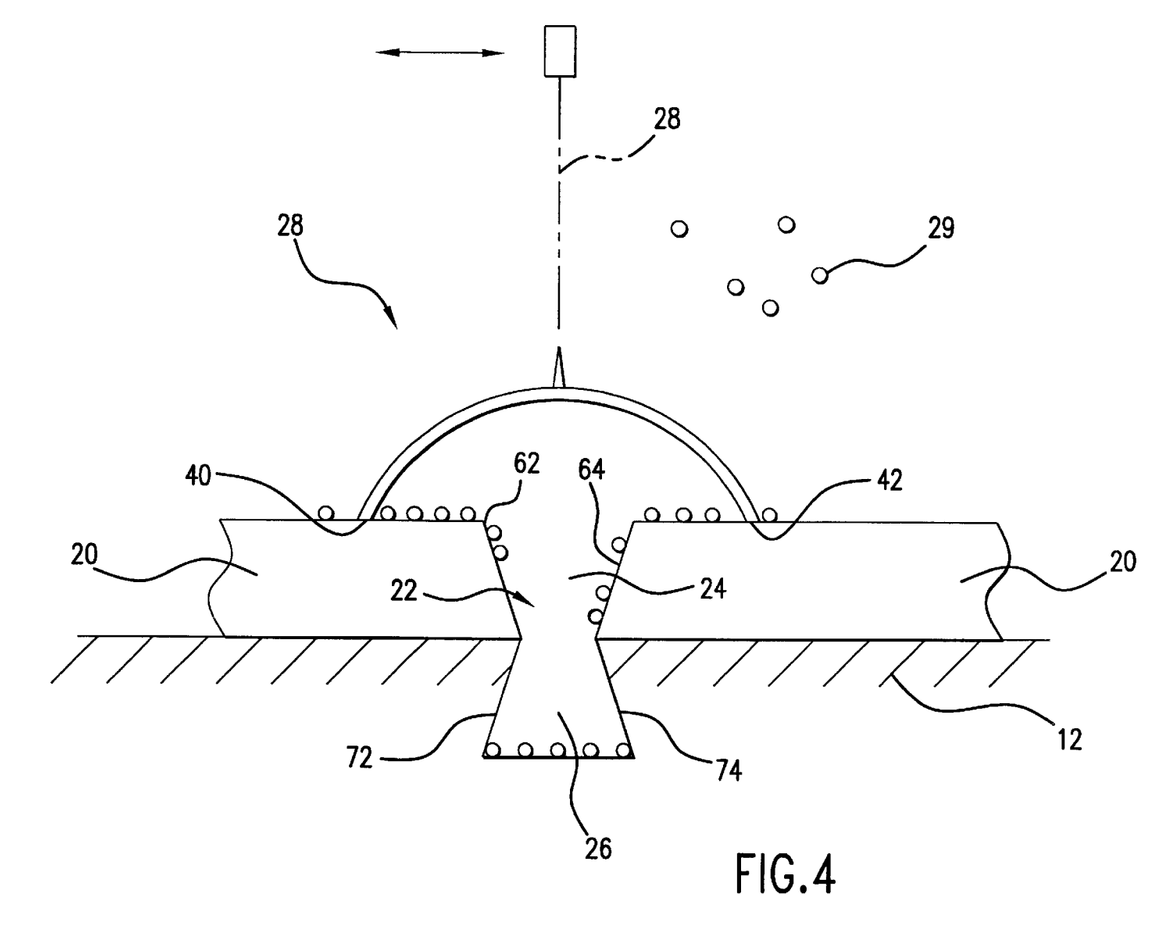
FIG. 4 illustrates a piezoresistive beam with the "arch"-like filament structure fabricated by the scanned electron beam technique of the present invention.
Figure 5:
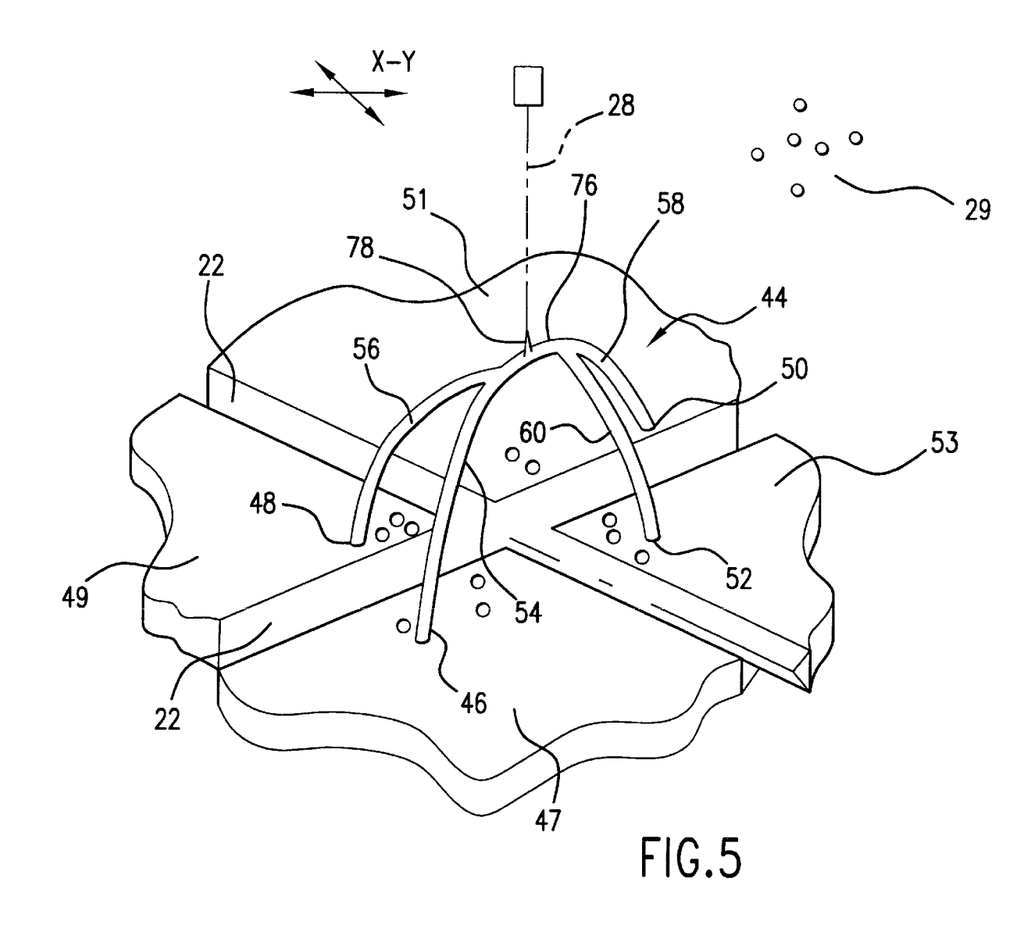
FIG. 5 illustrates on a somewhat enlarged scale the four leg nanoscale filament structure of the present invention.

In the second method, best shown in FIGS. 4 and 5, the cantilever 12 remains perpendicular to the electron beam 28, and a computer generated scanning pattern is used to produce the three dimensional filament structure by moving the beam 28 in small successive steps across the gap 22, in order that new material deposits are formed on the top of the structure being grown. The scanning pattern (generally called an arch scanning pattern) is controlled by a computer which defines the X and Y position of the electron beam 28 and the time the beam remains at a particular position, i.e., dwell time.

Starting from two base points 40 and 42 at each side of the gap 22, as shown in FIG. 4, the beam is slowly moved across the gap from point 40 to 42 and in reverse with the stops having predetermined time duration. Both sides of the legs are grown simultaneously by switching position from one side to the other after each dwell time step. It has been found that the growth rate for the deposit decreases during electron beam deposition (e.g., the amount of material added for a given electron exposure decreases with the distance from the base point at the substrate, causing a "bending" of the deposited structure). This effect can be corrected by increasing the exposure time with each successive step, in order to account for the decreased growth rate. In this way, linearly directed or straight legs may be grown if desired. After optimum values for the operating conditions, e.g., gas flux and beam focus have been determined, the process has been found to be reproducible and is therefore suited for producing a larger volume of nanoprobes shown in FIG. 4.

The second method permits fabrication of other geometries such as a filament with four legs shown in FIG. 5. This structure is more rigid than the "arch" shaped filament shown in FIG. 4, and permits electrical four point measurement, to be discussed in following paragraphs. The four leg structure 44 is created, as shown in FIG. 5, on the cantilever 12 where the gold leads 20 are separated by the crossing gaps 22, in a manner where the base points 46, 48, 50, and 52 for each leg of the four leg structure 44, are positioned on electrically isolated segments 47, 49, 51 and 53 separated by the gaps 22 cut in the shape shown in FIG. 3A or 4.

Generally, in forming the four leg filament structure 44 a digital rastering technique is used, in accordance with which the electron beam 28 may be scanned between the points 46, 48, 50, 52, in a clockwise or counter-clockwise fashion for quasi-simultaneous deposition and growth of the legs 54, 56, 58, and 60. The dwell time at each point determines the shape of the four leg structure 44. Alternatively, two legs at a time of the four leg structure may be grown in the quasi-simnultaneous fashion changing the precursor gas before depositing the other two legs. In this manner, a thermocouple structure may be formed.

During a crossing over of the gap 22, the electron beam 28 may cause an unwanted scattered deposition of the material on the areas surrounding the legs of the created structures. This may specifically occur on the walls 62 and 64 of the gap 22 which may cause a short between the gold leads portions 66 and 68 if the lower portion 26 is not formed, as shown in FIG. 3A or 4. By providing the lower portion 26, either in the form of an undercut or a void, the particles which undesirably may be deposited around the growing structures, including the area within the gap 22 between the gold leads portion 66 and 68, are not able to reach the walls 72 and 74 of the undercut portion 26 of the gap 22, thus preventing formation of a short between the gold leads portions 66 and 68 of the leads 20, as best shown in FIGS. 3A–5.

The first aforementioned method of growing the filament structures, i.e., when the electron beam remains stationary, in some circumstances may include advantages such as:

(a) since the electron beam is not scanned during deposition, the unwanted deposition onto the piezoelectric cantilever is limited to a small area at the base of each growing leg, thus reducing the risk of depositing a conductive surface layer across the gap;

(b) the height and shape of the structure is more easily controlled by the deposition time and the tilt angle; and (c) due to the fact that the leg is grown in successive steps, one may deposit two different materials, thus creating a thermocouple structure.

The second method, shown in FIGS. 4 and 5, when the sample remains perpendicular to the electron beam and a computer generated scanning pattern is used to produce a three-dimensional filament structure whereby the beam is displaced in small successive steps in X-Y directions so that new material deposits on top of the growing structure, is highly reproducible and is better suited for producing a larger volume of thermal probes than the first method described. Additionally, the second method permits fabrication of more complex geometries, such as the filament with four legs, shown in FIG. 5. This type of structure is not only more rigid than the "arch" shaped filament (shown in FIG. 4), but also permits electrical four point measurement discussed in previous and following paragraphs.

The four legged structure 44 may be fabricated by the first method, but is preferably fabricated by the second method. The process begins with defining the base point 46, 48, 50, and 52 electrically isolated one from another by the gap 22 which is specifically shaped to prevent shorting between the legs of the four leg structure 44.

Additionally, the electron beam may be scanned between the base points 46, 48, 50, and 52 in two manners:

(a) in quasi-simultaneous fashion when the process starts, for example from the base point 46 through the base points 52, 50, 48 returning to point 46 (remaining at each base point for a predetermined dwell time), or in the opposite direction, starting from the point 46 and moving sequentially through the points 48, 50, and 52 and returning to 46, thus growing base portions of the legs 54–60; or.

(b) the electron beam may be scanned diagonally in "arch" like fashion between the points 46 and 50 for growing the legs 54 and 58. When the legs 54, 58 are grown, the electron beam is scanned diagonally between the base points 48 and 52 for growing the legs 56, 60. Additionally, each leg of the four leg structure 44 may be grown separately using a digital rastering technique.

During the chemical vapor deposition (CVD), the electron beam remains in position for a dwell time, thus growing in each scan a small successive portion of each leg 54–60 of the four leg structure 44 until the bridge 76 is grown. Finally the tip 78 is grown at the center of the bridge 76 to complete the fabrication of the four leg structure 44, shown in FIG. 5. The structures with the legs of the length in the range of 1–10 $\mu$m and diameter in the range of sub 10—several 100 nm have been grown.

In order to study the mechanical stability of various filament geometries, the filament structures have been observed under force loading, using a micromanipulator. For this purpose, the filaments are deposited on the end of a standard AFM cantilever. Manipulation, with simultaneous imaging by the scanning electron microscope is performed with a sharp tungsten needle mounted onto a custom built piezo-driven manipulator. The force applied to the filament is therefore estimated directly from the observed deflection of the cantilever. All filaments used were resistant to destruction, e.g., no separated joints or detached legs have been observed.

The fabricated structures are generally highly flexible. The "arch"-like structure shown in FIG. 4 may be bent to almost 90° perpendicular to the long filament axes without becoming permanently deformed. However, flexibility of the "arch"-like filament is generally not desirable since it may lead to image distortions in the scanning contact mode of the probe. More rigid structures such as the four-leg filament 44 shown in FIG. 5 are thus preferred for use. For this type of structure no significant distortions have been observed under moderate force loads. Under higher loads, the structure tends to slightly buckle.

From the cantilever deflection and its known spring constant, the force necessary to cause buckling of the four-leg structure 44 has been estimated to be about $2\times10^{-7}$ Newton, which is well above the force needed to operate the cantilever in the topographic AFM contact mode. After releasing the needle, no deformation of the four-leg filament has been generally observed.

The temperature of the thermal nanoprobe is obtained by measuring the resistance of the probe. Generally, the thermal nanoprobe can be applied in two measurement modes: passive (the temperature is monitored as it is scanned across the surface), and active (the probe induces heat flow to the sample which depends on the thermal conductivity of the substrate). In the latter case the thermal nanoprobe operates as a highly localised source of heat used for thermal analysis. The observed thermal contrast results from variations in thermal conductivity of the surface components or diffusivity.

In the passive mode, the probe temperature is monitored by measuring the temperature dependent resistance of the filament during scanning of the probe over the surface of the measured sample 14, as shown in FIG. 1B, to observe the temperature difference between the probe 10 and the sample 14. The supply voltage of the sample is as small as possible in order to avoid self-heating of the sensor.

In the active mode, the probe 10 is heated by the current flowing through the sensor (not shown). The heat flow between the probe and the sample is influenced by the thermal conductivity of the sample and the temperature difference between the probe 10 and the surface of the measured sample 14. The supply voltage of the sensor is changed as necessary in a feedback loop to maintain the sensor resistance (sensor temperature) constant.

Figure 6:
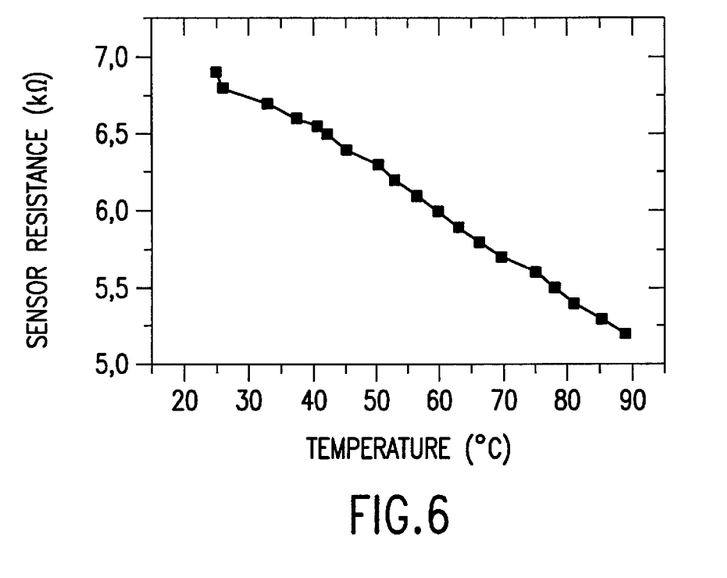
FIG. 6 is a graph of the resistance of the two-leg thermal nanoprobe versus temperature.
Figure 7:
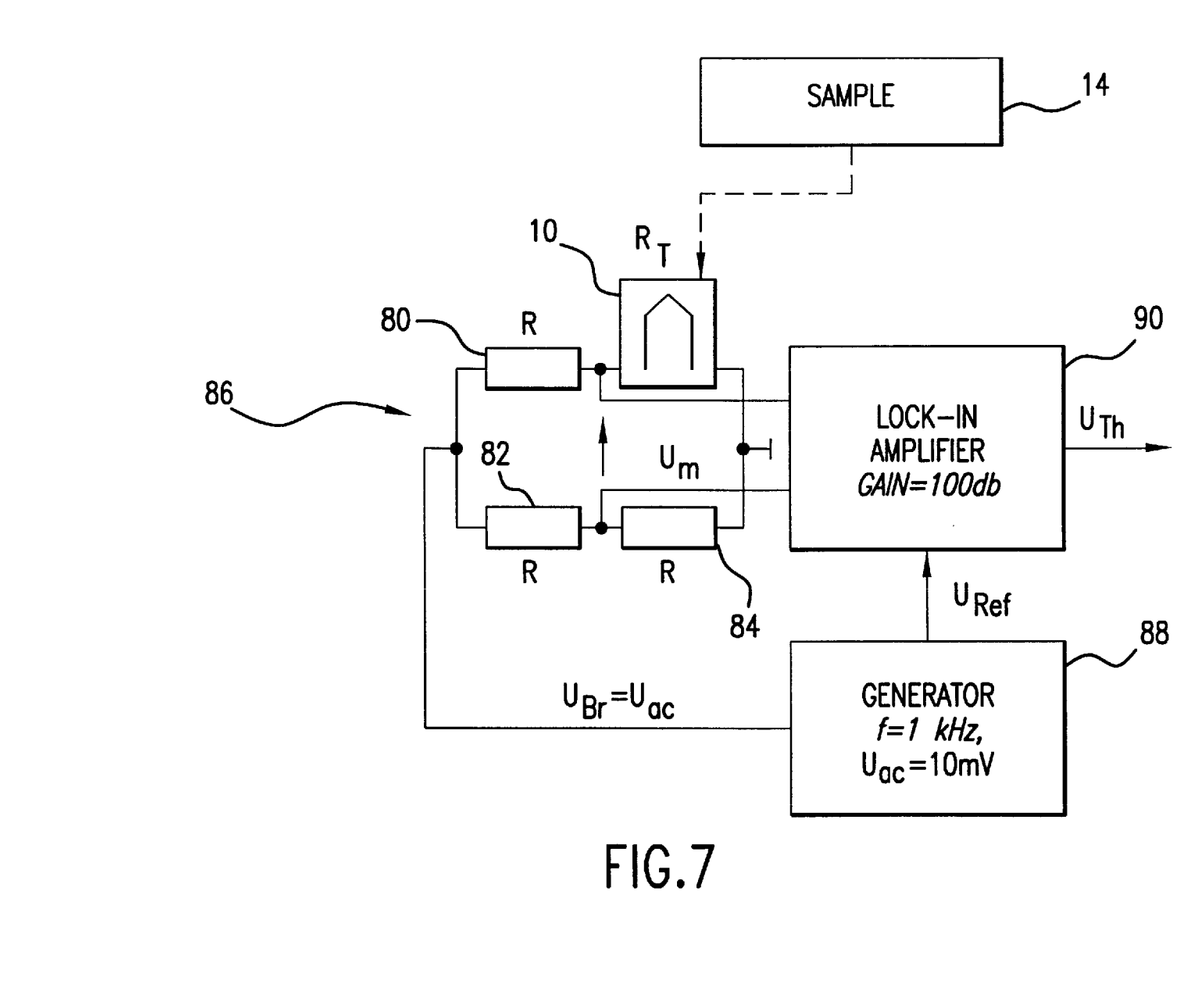
FIG. 7 is a schematic representation of the measurement set up in passive mode of scanning thermal microscopy with a thermal nanoprobe of the present invention.
Figure 8:
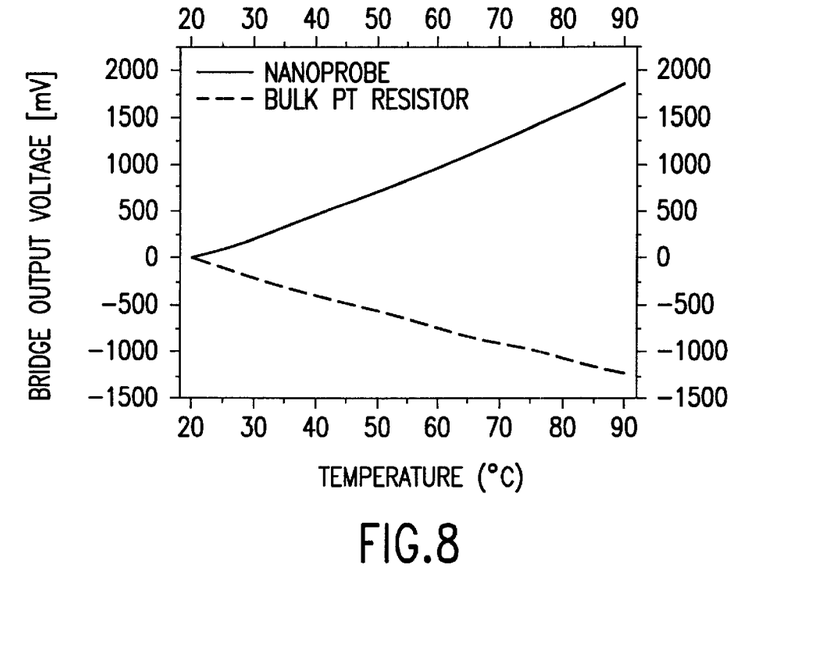
FIG. 8 is a graph of the output signal of the bridge of FIG. 6 versus temperature.

In actual experiments, the probe resistance was measured at various temperatures. It was observed that the resistance decreased from 7 down to 2 k Ohm in the temperature range from 20 up to 80° C., as shown in FIG. 6. In the measurement setup shown in FIG. 7, the thermal nanoprobe 10 was connected with three passive resistors 80, 82, 84 to form a bridge circuit 86. In this case the bridge output voltage Um can be calculated in the range of 2 $\mu$V/K (in comparison to $-0.05$ $\mu$V/K for the platinum resistor), as shown in FIG. 8. The measurements of such small voltages are subject to significant thermoelectric potentials from connections, as well as input offset voltage drifts due to the applied amplifiers and 1/f noise.

These problems may be reduced by increasing the bridge supply voltage $U_{Br}$, however, this is limited by the effect of self-heating of the resistance elements of the bridge circuit 86. Exciting the bridge 86 with AC voltage and using synchronous detection technique has been found to substantially eliminate the described problems.

In the passive mode, the bridge 86 is excited with the AC voltage with a frequency of 1 kHz and the amplitude of 10 mV supplied from the generator 88. The voltage $U_{th}$ on the output of a lock-in amplifier 90 is recorded by the analogue/digital converters of the scanning probe microscope and corresponds with the difference of temperatures between the sample 14 and probe 10. The feedback loop adjusts the DC voltage applied to the bridge 86 so that the bridge remains balanced. Heat flux from the thermal probe 10 is observed by monitoring the voltage and current applied to the circuit 86. The low thermal capacity of the probe allows a fast thermal response. The scanning nearfield thermal nanoprobe permits observations of topography features in the range of 1 nm in the bandwidth of 1 kHz. The thermal interaction area between probe and sample determines the spatial resolution of the sensor. Spatial resolution has been achieved in the order of less than 80 nm and a thermal resolution of $10^{-3}$ K.

Electrical measurements of the filament structures with four legs were performed with a lock-in technique similar to that one shown in FIG. 7, but adjusted to 4-leg measurements. Using a current limiting resistor, a 1 kHz 100 mV AC signal was transformed into a quasi constant AC current of $5 \times 10^{-9}$ A and the voltage drop across the filament legs was measured by the lock-in amplifier. To exclude temperature fluctuation caused by heat convection in air, the filament structure was placed within a vacuum chamber of the scanning electron microscope (SEM). For the filaments with 4 legs, the electrical measurements were conducted in two ways: (a) 2 point measurements or (b) 4 point measurements. In 2 point measurement, the AC-current was applied to two legs of the filament structure 44 and the voltage drop indicative of the temperature is measured at the same contacts.

In 4 point measurement, shown in FIG. 1B, the voltage drop was measured by contacting the opposite two legs, thus eliminating the contact resistance introduced into the measurements. Using the 4-point measurement, the resistance of the upper filament segment (between the points where the legs merge) was found to be in the range of 70 k$\Omega$. Given the known length and diameter of the filament "wire", this value corresponds to a resistivity for the e-beam deposited platinum material of ~0.01 $\Omega$cm. Resistivity values for the 2-point measurements were higher, with values in the range of 0.03 to 0.05 $\Omega$cm. One possible explanation for this difference could be a contact resistance between the filament leg and the metal pad (both aluminum and gold pads have been used and lower resistivity values have been found for the gold pads). However, due to the high impedance voltage measurement involved in the 4-point probe technique, there is a possibility that resistive or capacitive coupling to the voltage probe pads or a nonlinear IV characteristic of the filament or contact (e.g., increased resistivity at low currents) produce erroneous results.

Figure 9:
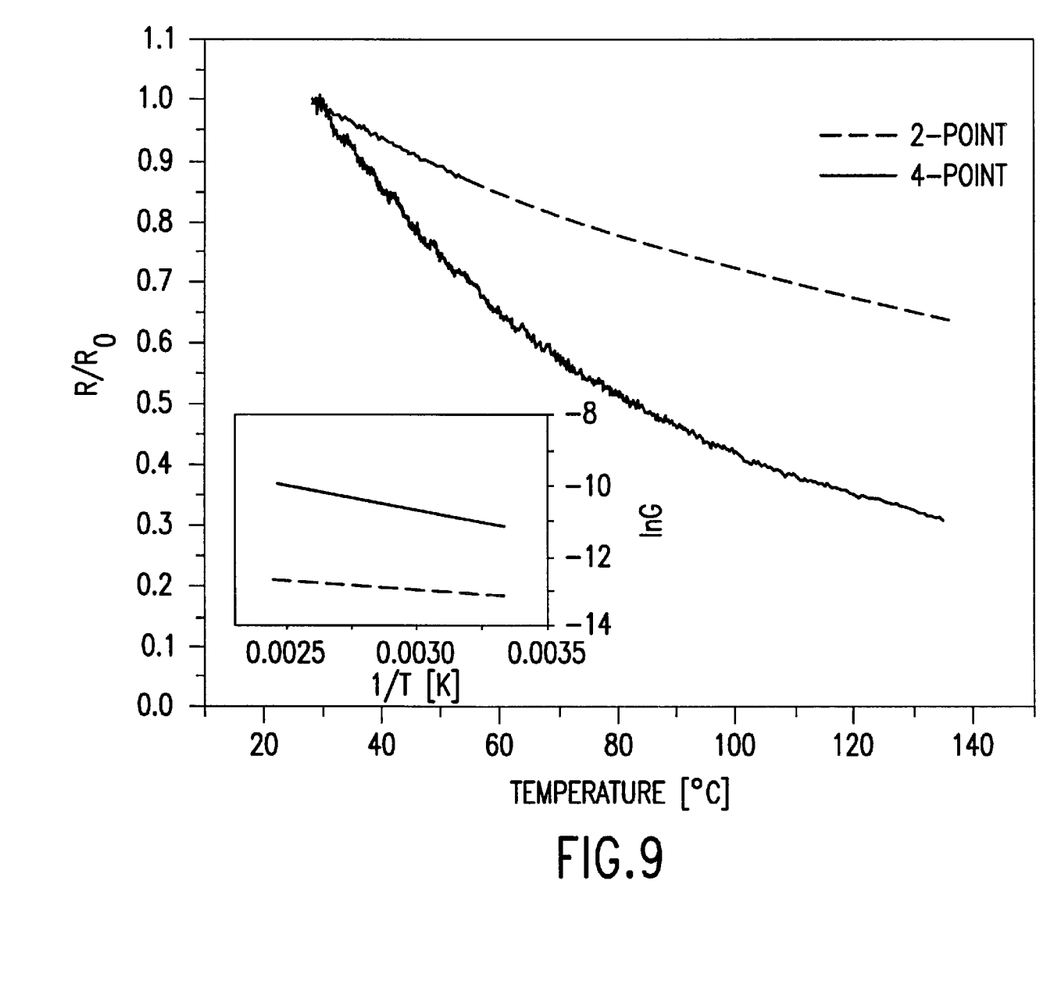
FIG. 9 describes a graph of the resistance change as a function of temperature for four point measurements and for two point measurements.

The resistance of the filament structure as a function of temperature was investigated, employing the same lock-in technique. For this measurement the filament, deposited onto a ~1 cm² silicon substrate with gold leads, was enclosed by a vacuum compatible heating tape (Omega), ensuring good thermal contact to the backside of the silicon substrate. The temperature was measured with a small K-type thermocouple, placed on one of the gold leads 20, close to the filament structure. The relative change in resistance compared to the resistance at room temperature ($R/R_0$) is shown in FIG. 9 for both a 2-point and a 4-point measurement. For a temperature increase of 1000° C. a drop in resistance to about 30% (4-point) and 70% (2-point) was observed compared to the room temperature values. A plot of ln (1/R) vs 1/T (not shown) exhibits a linear dependence as expected for Poole-Frenkel type conduction with an activation energy of 0.25 eV for the 4-point technique and 0.11 eV for the 2-point measurement.

Compared to the 2-point measurement, the 4-point measurement exhibited a stronger temperature dependence with respect to the resistance. As discussed above, one possible explanation for this observation is, that the resistance measured by the 2-point measurement includes a significant, and presumably temperature insensitive, contact resistance. Since the contact resistance is included in the measured values for both R(T) and R0 (e.g. R at room temperature), the relative change in resistance R/R0 is smaller. Another advantage of the 4 leg filament structure is that in this case only the resistance of the upper segment is measured. Since this segment is the closest to the sample 14 for which the temperature is to be measured in the scanning thermal probe operation, errors in the temperature reading introduced by the temperature gradient along the filament wire are minimized.

Thus, mechanical and electrical properties of freestanding, nanometer-sized wires have been investigated. Because of their low thermal mass and minimal thermal contact with the substrate, these filament structures are envisioned to be ideal probes for high resolution scanning thermal microscopy, where low heat conductivity and low thermal capacitance of the probe as well as a small sample-probe contact area are required.

The direct electron beam writing technique used to fabricate the probes can be fully automated, thus making this method commercially competitive.

Mechanical tests show that the probes with four leg filaments are durable and rigid enough to allow operation in a standard AFM-type scanning probe microscope. Both electrical and mechanical tests show, that the filament structure with four legs has clear advantages over simple geometries. In combination with a 4-point resistance measurement and lock-in techniques, contact potentials and contact resistivity can be eliminated, which increases both the temperature sensitivity and the signal-to-noise ratio. These probes have a very high thermal resistance on the order of $10^8$ Kelvin/Watt.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A thermal nanometer scale probe for thermal measurements of a sample, comprising:

a piezoresistive cantilever including a conductive patterned layer formed on a surface thereof, said conductive patterned layer having a plurality of electrically isolated segments defined therein, and a multi-leg nanometer-scale filament structure deposited on said conductive patterned layer of said piezoresistive cantilever, said multi-leg nanometer-scale filament structure including a plurality of legs, a bridge portion and a contact tip positioned in a center of said bridge portion, each leg of said multi-legs filament structure having a bottom end and a top end, said bottom end of each said leg contiguously engaging a respective one of said plurality of electrically isolated segments, and said top ends of said legs of said multi-leg nanometer scale filament structure being joined together by said bridge portion.

2. The thermal nanometer-scale probe of claim 1, wherein said multi-leg nanometer scale filament structure is a 3-dimensional structure including four legs.

3. The thermal nanometer-scale probe of claim 1, wherein said segments of said conductive patterned layer are electrically separated by respective gaps cut into the surface of said conductive patterned layer at predetermined locations, each of said gaps including an undercut portion thereof having areas unaccessible to a conductive material deposited onto said surface of said conductive patterned layer.

4. The thermal nanometer-scale of claim 1, wherein said segments of said conductive patterned layer are electrically separated by respective gaps cut into the surface of said conductive patterned layer at predetermined locations, each of said gaps being shaped in a fashion to define therein at least one portion unaccessible by a conductive material deposited onto said surface of said conductive patterned layer.

5. The thermal nanometer-scale probe of claim 1, wherein said multi-leg filament structure is formed of sub-ten nanometer sized platinum crystallites embedded in an amorphous carbonaceous matrix.

6. The thermal nanometer scale probe of claim 1, wherein said multi-leg filament structure is formed of at least one material from the group of materials including: tungsten, gold, molybdenum, and cobalt.

7. The thermal nanometer scale probe of claim 1, wherein said conductive patterned layer includes a gold layer.

8. The thermal nanometer-scale probe of claim 1, wherein said conductive patterned layer is formed in proximity to a front edge of said cantilever.

9. The thermal nanometer-scale probe of claim 1, wherein the length of said legs is in the range of 1–10 $\mu$m.

10. The thermal nanometer-scale probe of claim 3, wherein the width of said gap is in the range of sub-100 nm–10 $\mu$m.

* * * * *